April 14, 1959 A. WAGNER 2,881,685
FLASHLIGHT ATTACHMENTS FOR CAMERAS
Filed Dec. 15, 1953 3 Sheets-Sheet 2
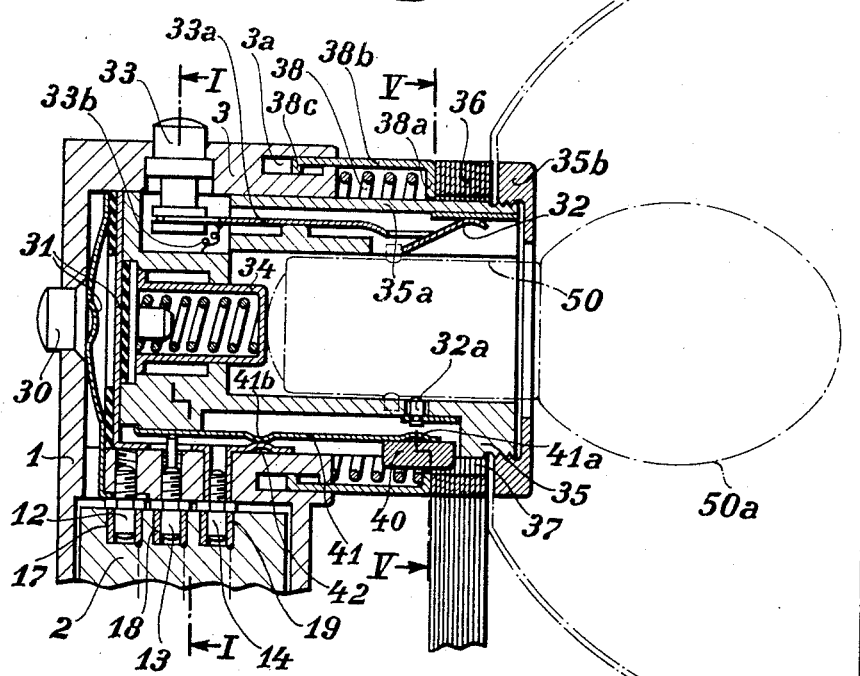
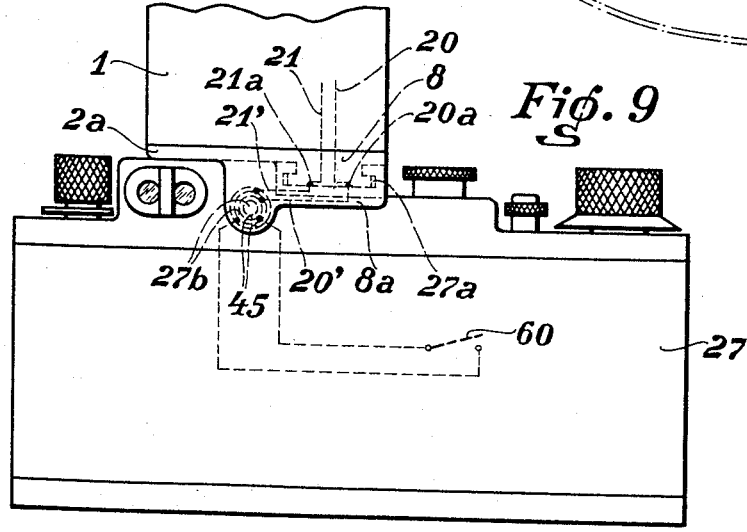
ADAM WAGNER INVENTOR.
BY
Ivan E. C. Königsberg April 14, 1959     A. WAGNER     2,881,685
FLASHLIGHT ATTACHMENTS FOR CAMERAS
Filed Dec. 15, 1953     3 Sheets-Sheet 3

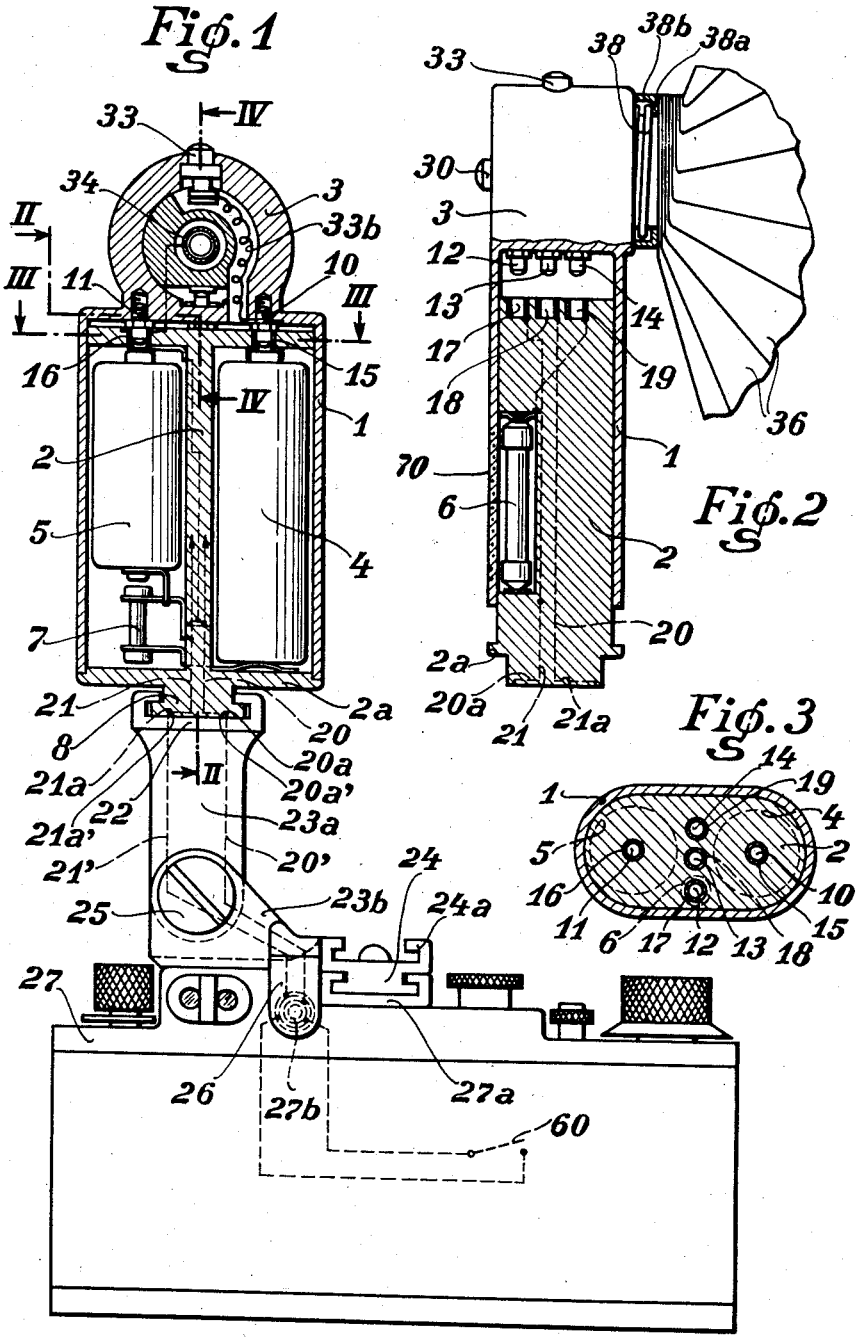

INVENTOR.
ADAM WAGNER
BY

United States Patent Office 2,881,685
Patented Apr. 14, 1959

2,881,685
FLASHLIGHT ATTACHMENTS FOR CAMERAS

Adam Wagner, Wetzlar (Lahn), Germany, assignor to Ernst Leitz, G.m.b.H., a corporation of Germany Application December 15, 1953, Serial No. 398,361

Claims priority, application Germany March 12, 1953

7 Claims. (Cl. 95—11.5)

The object of this invention is to provide an improved flashlight attachment for use on a camera having a synchronizing device with particular reference to an improved electric circuit whereby the flash lamp may be tested although it is inserted in regular working position. Other electric circuit elements may also be tested. The invention includes the operation of a lamp reflector which is so arranged that it may be positioned to cause the closing of a test circuit as well as closing the ignition circuit through the lamp when the reflector is placed in reflecting position. The reflector may be moved into a non reflecting position and then another test circuit is formed for testing the entire electrical condition of the attachment.

Another object of the invention is to provide a flashlight attachment in the form of two units which may be separately manufactured for separate use. Both units are adapted to be connected to form a flashlight attachment and both units are provided with circuit terminals for connection with a socket on the camera leading to the camera synchronizing device.

Another object is to provide a flashlight attachment in a very compact practical form so that separate parts may be carried in the pockets of the photographer. In the accompanying drawings Fig. 1 is a rear view of a camera with the attachment connected thereto, the attachment being shown partly in section.

Fig. 2 is a side view with parts in section on the line II—II of Fig. 1 and with parts displaced.

Fig. 3 is a sectional view on the line III—III of Fig. 1.

Fig. 4 is an enlarged sectional view on the line IV—IV of Fig. 1 with the flash lamp in position and parts of the foldable reflector folded, together with electrical connections for the lamp socket, the lamp testing circuit and adjacent parts.

Fig. 9 shows a modification.

Figure 5:
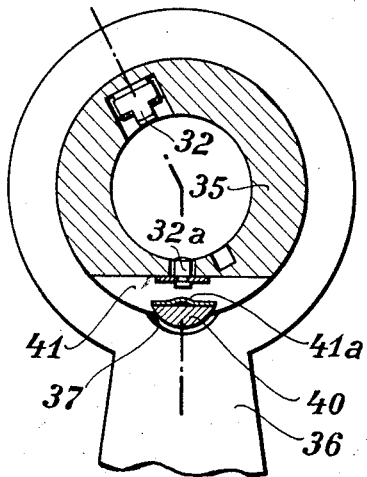
Fig. 5 is a partial sectional view on the line V—V of Fig. 4.

The flashlight attachment according to this invention consists of two separate units. One unit contains the flash lamp and the circuit forming elements for connection with a camera, both electrically and mechanically. This unit also supports the lamp reflector and switch means for changing the circuits. The second unit is a holder with means for detachably connecting the first unit to the camera. The holder is provided with a hinge for angular adjustment of the flash lamp with respect to the object and the camera objective. The holder is also provided with electric current conducting elements arranged in an improved form for connection with the camera synchronizing device, and with the circuit elements carried in the first unit.

The first said unit comprises two main parts, an outer tubular casing 1 and an inner main support 2 which is slidably contained and fitted within the casing. The latter is formed at its upper outer end with a lamp housing 3. The support 2 carries a battery 4, a condenser 5, a test lamp 6 and an electrical resistance 7. The parts 1 and 2 are made of non-conducting material. The portion 70 of the casing 1 which lies in front of the test lamp 6 is made translucent or otherwise arranged for observation from the outside of the flare or shine of the test lamp when the latter is lit during a test. The entire casing 1 may of course be made of material which permits such outside observation.

The casing 1 supports electrically conducting plugs 10, 11, 12, 13 and 14 which extend into the casing as shown in Figs. 1 and 2 and are adapted to connect with complementary conducting sockets 15, 16, 17, 18 and 19 in the upper end of the support 2 when the latter is inserted within the casing. The wires and other electrical conducting elements from the flash lamp 50—50a, Fig. 4, are supported within the lamp housing 3 and connected to said plugs 10-14. The wires 20 and 21 leading from the sockets 18 and 17, respectively to the camera synchronizing device are supported within the support 2. When the support 2 is fully inserted within the casing 1 the said plugs and sockets are automatically coupled in electric conducting relation to complete the circuits from the lamp to the circuit terminals for connection with the camera synchronizing device.

Figure 6:
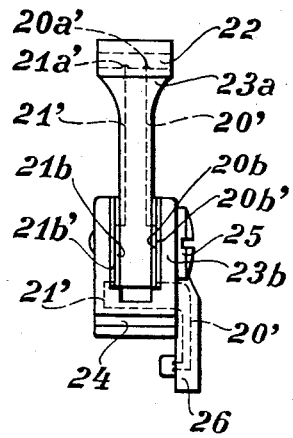
Fig. 6 is a detail view of the hinge connection in the attachment holder for attaching the apparatus to a camera.

Within the support 2 two main wires 20 and 21 connect the coupled contacts 13—18 and 12—17, respectively, with recessed contact plates 20a and 21a in a foot 8 which is formed in the bottom 2a of the support 2. The foot 8 is insertable in a complementary shoe 22 provided in the holder 23a—23b, or the foot 8 may be inserted in a shoe 27a on the camera as shown in Fig. 9. The holder consists of two arms 23a and 23b, Figs. 1, 6 and 7, hinged together at 25 in angularly adjustable relation. The horizontal arm 23b is at its free end provided with a foot 24 which is insertable in a shoe 27a on the camera. The foot 24 may itself be provided with a shoe 24a for receiving the foot of a finder or other like instrument to be mounted on the camera.

Figure 7:
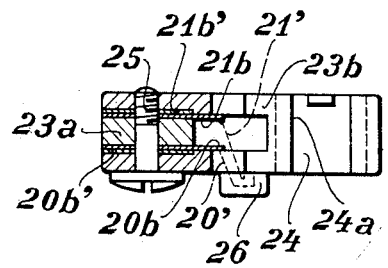
Fig. 7 is a sectional view of the holder hinge.

The upper holder arm 23a is provided with circuit terminal contacts 20a' and 21a' which engage the aforesaid contact plates 20a and 21a in the foot 8 whereby to continue the circuits from the wires 20 and 21 within the support 2 and through the holder by way of the wires 20' and 21' therein and whereby the wires 20 and 21 are connected with the rotatable sliding connecting plates or disks 20b—20b' and 21b—21b' in the hinge 25, Fig. 7. The said sliding contact plates permit angular adjustment of the upper holder arm without breaking the circuit.

The foregoing description relates to the circuit from the flash lamp via the coupled contacts 10—19 in the casing and the support down through the holder and to the connecting socket 27b in the camera.

The lamp housing 3, Fig. 4, supports a testing switch 31 operable by a test button 30 and also supports a foldable reflector 36 and the lamp 50a with the base 50 inserted in a lamp socket 35. The lamp is retained in the lamp socket by a conducting spring 32 against a throw out spring pressed contact sleeve 34. The retaining spring 32 may be pushed aside to release the lamp by rotation of a throw out button 33 which operates an arm 33a on the button to move the retaining spring aside for lamp release. The spring pressed contact sleeve 34 will then expel the lamp. The sleeve 34 and the spring 32 are electrically connected in the lamp circuit by a wire 33b, Figs. 1 and 4. The lamp socket 35 also carries a contact button 32a, Fig. 4.

The lamp socket 35 has a sleeve 35a which supports a reflector 36. The reflector may consist of individual blades which fold (close) or unfold (open) like the blades of a fan, or the reflector may be in one piece. A spring 38 presses against the outer flanged end 38a of a sleeve 38b. The end 38a engages the reflector blades under pressure of the spring 38 and prevents deformation of the thin blades, or for yieldingly supporting a one piece reflector. The sleeve 38b has an inner flanged end 38c which slides in a groove 3a in the housing 3 and which limits the outward movement of the sleeve 38b. This is an advantage when the reflector supporting ring 35b is removed in order to place an additional reflector of another type on the sleeve 35a. Such an additional reflector is shown in Fig. 4 in dotted lines. The reflector blades or reflector are then pressed inward against the spring pressure 38. By removing the ring 35b the reflector 36 may be entirely removed and replaced with another type reflector. Different types of reflectors may be used so as to obtain the best possible picture under the existing local light conditions. If a very large lamp bulb is used, the thin reflector blades may under the spring pressure lean against the bulb for additional support.

The blades of the reflector 36 are cut out to provide a channel 37 when the blades are folded, Figs. 4 and 5. If a single piece reflector is used it will be provided with a similar channel so located in the reflector that it may be moved into a position similar to the one shown and for the same purpose. The reflector is a switch closing member in that it serves to lift a contact base 40, carried by a contact spring 41, into a position in which a contact 41a formed in the outer free end of the spring 41 engages the contact 32a in the lamp socket 35 when the reflector is moved into reflecting position.

The contact spring 41 is secured in the lamp housing, insulated therefrom, but in permanent conducting engagement with the connecting plug 13, Fig. 4. The spring 41 forms two contacts 41a and 41b. Contact 41a is adapted to engage the contact 32a when the contact base 40 is lifted by the reflector. The other spring contact 41b engages a fixed contact 42 which is a part of the aforesaid coupling connection 14—19 in the casing 1 and support 2, respectively.

Figure 8:
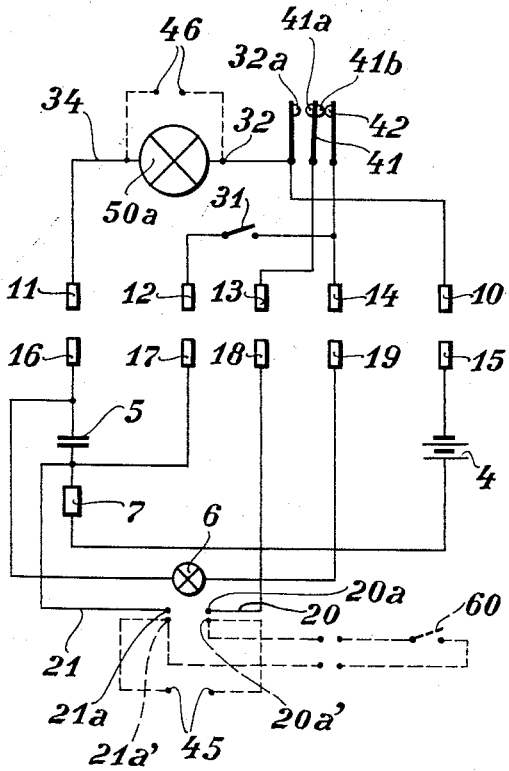
Fig. 8 is a wiring diagram.

When the contacts 41b and 42 are closed as in Figs. 4 and 8 because the reflector has then been moved into non reflecting position, the test lamp 6 is included in the synchronizing circuit so that by closing the synchronizing switch 60 in the camera, Fig. 1 a circuit test may be made to test the lamp, the synchronizing device and the electrical connections. In Fig. 8 this testing circuit may be traced as follows:

From the battery 4 to resistance 7, wire 21, switch 60, wire 20, contacts 18—13, closed contacts 41b—42, contacts 14—19, test lamp 6, contacts 16—11, connecting throw out sleeve 34, flash lamp 50a, connecting holding spring 32, contacts 10—15 and back to the battery 4.

Although current from the battery will flow through the flash lamp, the latter will not be ignited because of the inclusion of the resistance 7 in the circuit. Heretofore it has been customary to use a testing lamp in place of the flash lamp in order to test the circuit. This invention provides a circuit whereby the use of a test lamp temporarily inserted in the synchronizing circuit is avoided.

When the reflector 36 is rotated to place it in reflecting position the rotative movement involved causes a radially inward displacement of the contact base 40 whereby the spring 41 is lifted and moved away from engagement with the fixed contact 42. The contacts 41a and 32a are then closed, the spring 41 being switched from contact 42 to contact 32a.

The charging condition of the condenser and the working condition of the flash lamp may be tested by closing the circuit by the test switch 31. The circuit may be traced in Fig. 8 as follows: From the battery 4 to resistance 7, contacts 17—12, test switch 31, contacts 14—19, test lamp 6, contacts 16—11, connection at 34, flash lamp 50a, connection at 32, contacts 10—15 and back to the battery. Inasmuch as the resistance is also included in the circuit, the flash lamp will not be ignited.

Only when the resistance 7 is short circuited by operation of the synchronizing switch 60 can sufficient current be discharged from the condenser to the flash lamp to ignite the latter to produce a flash. The ignition circuit is traceable in Fig. 8 as follows: From the condenser 5 to contacts 16—11, connection 34, flash lamp 50a, connection 32, closed contacts 32a—41a, contacts 13—18, wire 20, camera switch 60, wire 21 and back to the condenser. In this ignition circuit the resistance 7 is not included, but short circuited.

It will be apparent from the foregoing description and the drawings that this invention provides a flash attachment comprising the two named units, one being composed of the casing 1 and support 2 and the other unit consisting of the holder. The unit 1—2 may be attached to a holder or directly to the camera. The two units are detachable, one from the other, and from the camera. The casing 1 and the support 2 are easily separated for separate transportation. When the support is moved out of the casing 1 the circuits are broken and vice versa. The circuit elements on the support 2 are accessible and replaceable when the support is detached from the casing. When the holder is inserted in the camera shoe 27a the holder plug 26 connects automatically with the camera socket 27b and the synchronizing device.

Fig. 9 illustrates a modification in which the flash unit is attached directly upon the camera. The foot 8 of the support 2 is here provided with a push-in connection in the form of a lug 8a which serves as a support on the camera as in Fig. 9, or it may be included in the holder shown in Fig. 1. The lug 8a carries an electric coupling contact 45 connected with the lamp circuit wires 20 and 21. The contact 45 is inserted in the camera socket 27b for connection with the synchronizing device. The contact plates 20a and 21a in the shoe 8 are then not used. If the attachment includes the hinged holder, then the coupling contact 45 is free and can be used for connecting a cable from a remote flash attachment, or the connection 45 may be used for an additional attachment operated from the switch 60. A separate switch control, hand operated, may also be used. These and other modifications are not illustrated. If it is desired to use several simultaneous flashes, one or more flash circuits may be connected as at 46, Fig. 8.

From the foregoing description it will be clear that when the reflector is placed in reflecting position, a test of the condenser, the flash lamp and connections may be made by closing the test switch 31. In this circuit the resistance is included and will prevent ignition of the flash lamp. With the reflector in non reflecting position a test may be made by closing the camera switch 60. Again the resistance is included in this circuit, and the flash lamp will not be ignited. Ignition of the flash lamp is obtained only by short circuiting the resistance and the current for the flash is then obtained from the condenser.

I claim:

1. A flashlight attachment for a camera comprising an outer tubular casing, a lamp housing formed at one end thereof for supporting a flash lamp therein, the other end of said casing being open; a flash lamp in said housing; exposed electric circuit terminal plugs supported in the inner end of said casing; electric circuits within said lamp housing to and between said lamp and terminal plugs; a foldable lamp reflector supported in said lamp housing and manually operable from a reflecting into a nonreflecting position with relation to said lamp; a main support slidably and detachably contained within said tubular casing; electric circuit terminal sockets supported in the inner end of said support; exposed circuit terminal contacts supported in the outer end of said support; electric circuits in said support to and between the said exposed terminal sockets therein and the said exposed contacts; said exposed terminal plugs and terminal sockets in said support being automatically coupled in electric conducting relation for completing the electric circuits between the said lamp and the said exposed terminal contacts when the said support is fully inserted within the said casing, a spring contact in said lamp housing permanently connected to one of said exposed electric circuit terminal plugs, said spring contact forming two contact portions, an exposed lamp socket contact in said lamp housing and means on the said reflector for moving one of said contact portions of said spring contact to engage said lamp socket contact when said reflector is moved into a non-reflecting position with relation to the flash lamp whereby to provide a test circuit through said flash lamp.

2. A flashlight attachment according to claim 1 in which the electric circuits in the said main support include an electric battery, an electric condenser, an electric resistance and an electric test lamp electrically connected with the said groups of terminal contacts in the inner end of the said main support; said battery, condenser, resistance and test lamp being detachably connected in said main support for replacement when the support is withdrawn from said casing.

3. A flashlight attachment according to claim 1 including means in said lamp housing for supporting the reflector therein for manual operation of the reflector and spring means in said housing engaging the reflector for slidably retaining the reflector in either its reflecting or its nonreflecting position with respect to the lamp.

4. A flashlight attachment for a camera comprising a casing; a battery, a condenser, a test lamp, a resistance, a normally open test switch and a flash lamp, all supported within the casing; said camera having a casing and a normally open flash switch; means on the said two casings for operatively securing said attachment to the camera; circuit means within the attachment casing operatively connecting together the aforesaid elements therein; means on said camera electrically operatively connecting the said six elements within the attachment casing with the said flash switch when the attachment is secured upon the camera; said circuit means within the attachment casing including two fixed contact terminals and a spring actuated movable switch blade permanently connected to said camera flash switch when the attachment is connected with the camera; said blade being movable to engage with either of the said two fixed terminals; a movable flash lamp reflector mounted upon the attachment casing and manually movable from a reflecting into a nonreflecting position and vice versa; means on said reflector for moving said movable switch blade to engage one of the said two fixed terminals, when said reflector is moved into reflecting position to form a test circuit within said circuiting means through the said resistance, test lamp and said flash lamp upon closing of said test switch; and to form an ignition flash circuit through the said flash lamp upon closing of said camera switch; a spring for automatically moving said movable switch blade to engage the other of said two fixed terminals, when said reflector is moved into a nonreflecting position, to form within said circuiting means a test circuit through the said flash lamp, resistance and connecting circuits upon closing of the said camera flash switch.

5. A flashlight attachment for a camera comprising a casing, a battery, a test lamp, a resistance and a flash lamp within said casing, electric circuiting means interconnecting the said elements within said casing; said camera having a casing and a normally open flash switch therein; means on the said two casings for operatively connecting said attachment to the camera and simultaneously therewith electrically operatively connecting said circuiting means with the camera flash switch when the attachment is connected with the camera; a lamp reflector supported upon the attachment casing to reflect the flash from said flash lamp and manually movable into reflecting and nonreflecting positions on the attachment with respect to the flash lamp and switch means including a spring actuated movable switch blade for closing said switch means when said reflector is moved into its nonreflecting position whereby to provide a flash light test circuit through the said flash lamp.

6. The combination as set forth in claim 5 wherein the said attachment casing is provided with a translucent portion overlying the said test lamp for observing the ignition thereof during the said test of the flash lamp.

7. The combination as set forth in claim 5 wherein the circuit means include a test switch and a condenser whereby to provide a test circuit through the said flash lamp and the said condenser upon closing of the test switch.

References Cited in the file of this patent

UNITED STATES PATENTS

| | | |
|---|---|---|
| 1,895,835 | Johnson | Jan. 31, 1933 |
| 2,014,266 | Sherbondy | Sept. 10, 1935 |
| 2,329,011 | Steiner | Sept. 7, 1943 |
| 2,443,163 | Harmon | June 8, 1948 |
| 2,467,591 | Lidfeldt et al. | Apr. 19, 1949 |
| 2,565,492 | French | Aug. 28, 1951 |
| 2,602,879 | Whelan | July 8, 1952 |
| 2,646,672 | Fairbank | July 28, 1953 |
| 2,661,671 | Jacobson et al. | Dec. 8, 1953 |
| 2,678,417 | McMath | May 11, 1954 |
| 2,685,668 | Ameele | Aug. 3, 1954 |
| 2,688,071 | Wright | Aug. 31, 1954 |
| 2,719,469 | Sanford | Oct. 4, 1955 |